(12) United States Patent
Kawase et al.

(10) Patent No.: US 9,246,160 B2
(45) Date of Patent: Jan. 26, 2016

(54) ANODE AND BATTERY USING THE SAME (75) Inventors: Kenichi Kawase, Kanagawa (JP); Tomoo Takada, Kanagawa (JP); Yukio Miyaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 1842 days.

(21) Appl. No.: 10/743,172

(22) Filed: Dec. 22, 2003

(65) Prior Publication Data

US 2004/0161670 A1    Aug. 19, 2004

(30) Foreign Application Priority Data

Dec. 26, 2002    (JP) ................ P2002-376572

(51) Int. Cl.
*H01M 4/38* (2006.01)
*H01M 4/40* (2006.01)
*H01M 4/13* (2010.01)
*H01M 4/134* (2010.01)
*H01M 4/139* (2010.01)
*H01M 4/485* (2010.01)
*H01M 4/66* (2006.01)
*H01M 4/70* (2006.01)
*H01M 4/78* (2006.01)
*H01M 10/052* (2010.01)
*H01M 4/04* (2006.01)
*H01M 4/131* (2010.01)
*H01M 4/1395* (2010.01)
*H01M 4/36* (2006.01)
*H01M 4/525* (2010.01)
*H01M 10/0587* (2010.01)
*H01M 4/02* (2006.01)

(52) U.S. Cl.
CPC ............... *H01M 4/13* (2013.01); *H01M 4/134* (2013.01); *H01M 4/139* (2013.01); *H01M 4/38* (2013.01); *H01M 4/485* (2013.01); *H01M 4/661* (2013.01); *H01M 4/70* (2013.01); *H01M 4/78* (2013.01); *H01M 10/052* (2013.01); *H01M 4/0471* (2013.01); *H01M 4/131* (2013.01); *H01M 4/1395* (2013.01); *H01M 4/36* (2013.01); *H01M 4/525* (2013.01); *H01M 10/0587* (2013.01); *H01M 2004/027* (2013.01); *H01M 2004/028* (2013.01); *Y02E 60/122* (2013.01)

(58) Field of Classification Search
USPC .......................................... 429/128, 137, 302
See application file for complete search history.

(56) References Cited

U.S. PATENT DOCUMENTS

| 5,436,091 | A  | * | 7/1995  | Shackle et al. ................ 429/304 |
| 6,242,132 | B1 | * | 6/2001  | Neudecker et al. ........ 429/218.1 |
| 2002/0117469 | A1 | * | 8/2002  | Jito et al. ........................ 216/13 |
| 2004/0224231 | A1 | * | 11/2004 | Fujimoto et al. ............... 429/232 |
| 2007/0275301 | A1 | * | 11/2007 | Asahina et al. ............... 429/181 |

FOREIGN PATENT DOCUMENTS

| JP | 08-050922 | | 2/1996 | |
| JP | 11-135115 | * | 5/1999 | ............. H01M 4/36 |
| JP | 11-339777 | | 12/1999 | |

\* cited by examiner

Primary Examiner — Cynthia K Walls
(74) Attorney, Agent, or Firm — K&L Gates LLP (57) ABSTRACT

An anode, an anode current collector, an anode active material and a battery using the anode are provided. The anode includes the anode current collector and the anode active material. The anode current collector has a projection. The anode active material layer is formed via at least one of a vapor deposition method, a liquid-phase deposition method, a sintering method and the like.

16 Claims, 3 Drawing Sheets

ANODE AND BATTERY USING THE SAME

CROSS REFERENCE TO RELATED APPLICATIONS

This application is a priority application of Japanese Patent Application No. P2002-376572, filed Dec. 26, 2002, the disclosure of which is herein incorporated by reference.

BACKGROUND OF THE INVENTION

The present invention relates to an anode including an anode current collector and an anode active material layer, and a battery using the anode.

In recent years, as mobile devices have higher performance and more functions, secondary batteries with higher capacity used as power sources of the mobile devices have been desired. As a secondary battery which meets the requirement, there is a lithium secondary battery. However, in a now-typical lithium secondary battery using lithium cobalt oxide as a cathode and graphite as an anode, its battery capacity is in a saturation state, so it is extremely difficult to significantly increase the capacity. Therefore, it has been considered since a long time ago that lithium (Li) metal is used for an anode, but in order to put the anode to practical use, it is required to improve precipitation/dissolution efficiency of lithium and control dendrite deposition.

On the other hand, an anode with a higher capacity which uses silicon (Si), tin (Sn) or the like has been studied actively. However, due to expansion and shrinkage of an anode active material which occur when charge and discharge are repeated, the anode active material is cracked into small pieces, thereby the anode has extremely poor cycle characteristics such as a decline in current collecting performance, and promoting the decomposition of an electrolyte solution due to an increased surface area. Therefore, an anode which includes an anode active material layer formed on an anode current collector through a vapor deposition method, a liquid-phase deposition method or a sintering method has been studied (refer to, for example, Japanese Unexamined Patent Application Publication No. Hei 8-50922, Japanese Patent No. 2948205 and Japanese Unexamined Patent Application Publication No. Hei 11-135115). According to the anode, compared to a conventional coating type anode formed through coating with slurry including an anode active material in a particle shape, a binder and so on, the anode can be prevented from being cracked into small pieces, and an anode current collector and an anode active material layer can be formed as a unit, so electronic conductivity in the anode becomes very good, and in terms of capacity and cycle life, the anode is expected to have higher performance. Moreover, an electrically conducive material, a binder, a gap and so on conventionally included in the anode can be reduced or eliminated, so the anode can be formed into a thin film in essence.

However, even in the anode which includes the anode active material layer formed on the anode current collector by the vapor deposition method, the liquid-phase deposition method or the sintering method, due to expansion and shrinkage of the anode active material upon charge and discharge, the anode active material layer falls off or peeling off from the anode current collector, so the cycle characteristics are not sufficient enough.

SUMMARY OF THE INVENTION

The present invention provides an anode capable of improving cycle characteristics, and a battery using the anode.

A first anode according to an embodiment of the invention includes an anode current collector having a projection; and an anode active material layer being disposed on the anode current collector, and being alloyed with the anode current collector in at least a portion of an interface with the anode current collector, and including at least one kind selected from the group consisting of silicon and silicon compounds.

A second anode according to an embodiment of the invention includes an anode current collector having a projection; and an anode active material layer being formed on the anode current collector through at least one kind selected from the group consisting of a vapor deposition method, a liquid-phase deposition method and a sintering method, and including at least one kind selected from the group consisting of silicon and silicon compounds.

A first battery according to an embodiment of the invention includes a cathode; an anode; and an electrolyte, wherein the anode includes an anode current collector having a projection, and an anode active material being disposed on the anode current collector, and being alloyed with the anode current collector in at least a portion of an interface with the anode current collector, and including at least one kind selected from the group consisting of silicon and silicon compounds.

A second battery according to an embodiment of the invention includes a cathode; an anode; and an electrolyte, wherein the anode includes an anode current collector having a projection, and an anode active material layer being formed on the anode current collector through at least one kind selected from the group consisting of a vapor deposition method, a liquid-phase deposition method and a sintering method, and including at least one kind selected from the group consisting of silicon and silicon compounds.

In the first and second anodes according to an embodiment of the invention, by an enhanced effect of anchoring with the projection, adhesion properties between the anode current collector and the anode active material layer can be improved, and the anode active material layer can be prevented from falling off, peeling off and being cracked into small pieces due to expansion and shrinkage of the anode active material layer upon charge and discharge.

In the first and the second batteries according to an embodiment of the invention, the anode according to the invention is used, so the anode active material layer can be prevented from falling off, peeling off and being cracked into small pieces due to expansion and shrinkage of the anode active material layer, and decomposition of the electrolyte can be prevented accordingly. Thereby, cycle characteristics can be improved.

In an embodiment, the present invention provides a battery capable of improving cycle characteristics. The battery includes an anode current collector and an anode active material layer including Si or an alloy including silicon. The anode current collector has a projection in a particle shape on a surface of a substrate where the anode active material layer is formed. The anode active material layer is formed through a vapor deposition method, a liquid-phase deposition method and/or a sintering method, and is alloyed with the anode current collector in at least a portion of an interface with the anode current collector. By an excellent effect of anchoring with the projection, adhesion properties between the anode current collector and the anode active material layer can be improved, and the anode active material layer can be prevented from falling off, peeling off and being cracked into small pieces due to expansion and shrinkage of the anode active material layer upon charge and discharge, and decomposition of an electrolyte can be prevented accordingly.

Additional features and advantages of the present invention are described in, and will be apparent from, the following Detailed Description of the Invention and the figures.

DETAILED DESCRIPTION OF THE INVENTION

Preferred embodiments of the present invention will be described in more detail below referring to the accompanying drawings.

Figure 1:
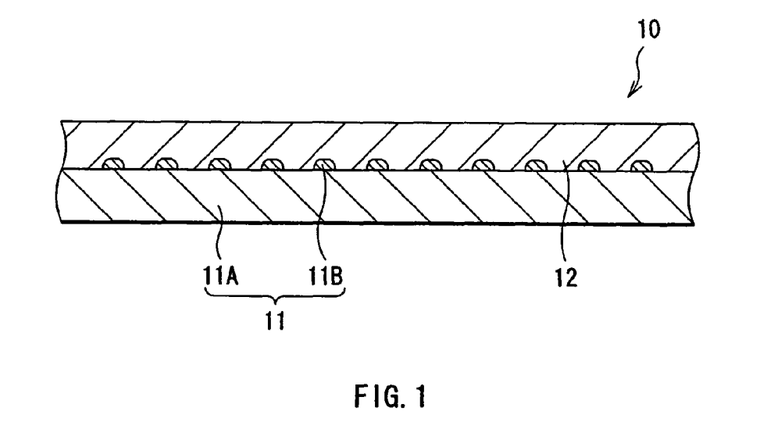
FIG. 1 is a sectional view of an anode according to an embodiment of the present invention.

FIG. 1 shows an anode according to an embodiment of the invention. An anode 10 includes, for example, an anode current collector 11 and an anode active material layer 12 disposed on one side or both sides of the anode current collector 11. The anode current collector 11 has a projection 11B in a particle shape on a surface of a substrate 11A where the anode active material layer 12 is formed. In the anode 10, adhesion properties between the anode current collector 11 and the anode active material layer 12 are improved by an excellent effect of anchoring with the projection 11B, and the anode active material layer 12 can be prevented from falling off, peeling off and being cracked into small pieces due to expansion and shrinkage of the anode active material layer 12 upon charge and discharge.

The substrate 11A is preferably made of a material with a certain degree of strength and high conductivity, and, for example, preferably includes at least one kind of material, such as copper (Cu), stainless, nickel (Ni), titanium (Ti), tungsten (W), molybdenum (Mo), aluminum (Al) and the like. There may be cases where the substrate 11A is preferably made of metal which is easily alloyed with the anode active material layer 12 among them. In the embodiment, as will be described later, the anode active material layer 12 includes at least one kind such as silicon and silicon compounds, so as the material of the substrate 11A, for example, copper, titanium, aluminum or nickel is suitable. The substrate 11A may have a single layer or a plurality of layers. In the case where the substrate 11A has a plurality of layers, a layer in contact with the anode active material layer 12 may be made of a metal material which is easily alloyed with the anode active material layer 12, and the other layers may be made of any other metal material. A surface of the substrate 11A is preferably smooth.

The projection 11B preferably includes an element which can be alloyed with the anode active material layer 12, because the projection 11B promotes alloying between the anode current collector 11 and the anode active material layer 12, thereby the adhesion properties are further improved. More specifically, the projection 11B preferably includes at least one kind of constituent or element which are easily alloyed with silicon or a silicon compound, for example, copper, nickel (Ni), iron (Fe), aluminum (Al), indium (In), cobalt (Co), manganese (Mn), zinc (Zn), silver (Ag), tin (Sn), germanium (Ge), lead (Pb) and the like. Moreover, the element included in the projection 11B may be the same as or different from that in the substrate 11A. The surface of the projection 11B may be coated with a film of oxide, but it is preferable that an element which can be alloyed with the anode active material layer 12 exists in the vicinity of an interface with the anode active material layer 12. The projection 11B may have any shape such as a spherical shape or a square shape, but the projection 11B preferably has an average diameter ranging from about 1 μm to about 20 μm, and more preferably from 3 μm to 10 μm. It is because when the average diameter is too small, a sufficient effect of anchoring with the projection 11B cannot be obtained, and when the average diameter is too large, the adhesion properties between the anode current collector 11 and the anode active material layer 12 tend to decline.

The anode active material layer 12 is formed through, for example, at least one kind selected from the group consisting of a vapor deposition method, a liquid-phase deposition method and a sintering method, and the anode active material layer 12 includes an anode active material. Therefore, damage due to expansion and shrinkage of the anode active material layer 12 upon charge and discharge can be prevented, and the anode current collector 11 and the anode active material layer 12 can be formed in a unit, thereby electronic conductivity in the anode 10 can be improved. Moreover, unlike a conventional coating type anode, a binder, a gap and so on in the anode 10 can be reduced or eliminated, and the anode 10 can be formed into a thin film. The anode active material layer 12 is preferably alloyed with the anode current collector 11 in at least a portion of an interface with the anode current collector 11. More specifically, it is preferable that in the interface, the element included in the anode current collector 11 is dispersed into the anode active material layer 12, or the element included in the anode active material layer 12 is dispersed into the anode current collector 11, or they are dispersed into each other. More preferably, because of the above reason, the anode active material layer 12 is alloyed with at least a portion of the interface of the projection 11B in the anode current collector 11. Although alloying often occurs when the anode active material layer 12 is formed through the vapor deposition method, the liquid-phase deposition method or the sintering method, but alloying may occur by heat treatment. In the description, the above-described dispersion of the element is considered as a mode of alloying.

The anode active material includes at least one material, such as silicon and silicon compounds, because silicon and the silicon compounds can be alloyed with lithium or the like, and have a large capacity for inserting and extracting lithium, so depending upon combination, the energy density of the anode 10 can be increased, compared to conventionally used graphite. Examples of the silicon compounds include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ where $0<v\leq2$, LiSiO, and the like.

The anode 10 can be manufactured through the following steps.

At first, as the substrate 11A, metal foil or the like including a single layer or a plurality of layers is prepared. The projection 11B in a particle shape is formed on the substrate 11A through, for example, the vapor deposition method or the liquid-phase deposition method to form the anode current collector 11. Alternatively, through a sintering method in which after the substrate 11A is coated with powder including metal particles, the powder is sintered, the projection 11B in a particle shape may be formed on the substrate 11A to form the anode current collector 11. The metal particles may have not only a spherical shape but also any other shape such as a rock shape and a block shape.

After the anode current collector 11 is formed, the anode active material, more specifically at least one type of silicon and silicon compounds is deposited through the vapor deposition method or the liquid-phase deposition method to form the anode active material layer 12. Alternatively, after a precursor layer including the anode active material in a particle shape is formed on the anode current collector 11, the precursor layer may be sintered to form the anode active material layer 12, or the anode active material layer 12 may be formed through a combination of two or more methods including, for example, the vapor deposition method, the liquid-phase deposition method, the sintering method, and the like. Thus, when the anode active material layer 12 is formed through at least one kind of method, such as the vapor deposition method, the liquid-phase deposition method and the sintering method, there may be cases where the anode active material layer 12 which is alloyed with the anode current collector 11 in at least a portion of the interface with the anode current collector 11 is formed. Further, in order to further alloy the interface between the anode current collector 11 and the anode active material layer 12, heat treatment may be additionally carried out in a vacuum atmosphere or a nonoxidizing atmosphere. Specifically, in the case where the anode active material layer 12 is formed with plating which will be described later, the anode active material layer 12 may resist being alloyed in the interface with the anode current collector 11, so the heat treatment is preferably carried out if necessary. Moreover, when the anode active material layer 12 is formed through the vapor deposition method, there may be cases where properties can be improved by further alloying the interface between the anode current collector 11 and the anode active material layer 12, so the heat treatment is preferably carried out if necessary.

As the vapor deposition method, for example, a physical deposition method or a chemical deposition method can be used, and more specifically, a vacuum deposition method, a sputtering method, an ion plating method, a laser ablation method, a thermal CVD (chemical vapor deposition) method, a plasma CVD method or the like can be used. As the liquid-phase deposition method, a known technique such as electrolytic plating or electroless plating can be used. As the sintering method, a known technique such as, for example, an atmosphere sintering method, a reaction sintering method or a hot press sintering method can be used.

The anode 10 is used in the following secondary battery, for example.

Figure 2:
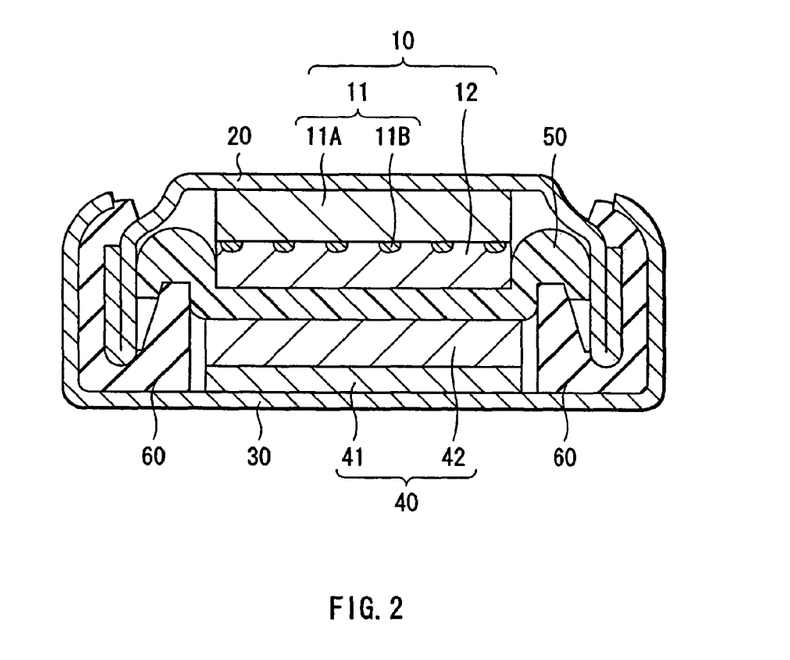
FIG. 2 is a sectional view of a secondary battery using the anode shown in FIG. 1.

FIG. 2 shows the structure of the secondary battery. The secondary battery is a so-called coin type battery, and includes a laminate including the above-described anode 10 contained in a package cup 20 and a cathode 30 contained in a package can 30 with a separator 50 in between. Edge portions of the package cup 20 and the package can 30 are caulked by an insulative gasket 60 to seal them. The package cup 20 and the package can 30 are made of, for example, metal such as stainless or aluminum.

The cathode 40 includes, for example, a cathode current collector 41 and a cathode active material layer 42 disposed on the cathode current collector 41. The cathode current collector 41 is made of, for example, aluminum, nickel, stainless or the like.

The cathode active material layer 42 includes, for example, one kind or two or more kinds selected from cathode materials capable of inserting and extracting lithium as cathode active materials, and the cathode active material layer 42 may include an conducive material such as a carbon material and a binder such as polyvinylidene fluoride if necessary. As the cathode material capable of inserting and extracting lithium, for example, lithium-containing metal composite oxide represented by a general formula $Li_xMIO_2$ is preferable. The lithium-containing metal composite oxide can generate a high voltage, and has a high density, so the secondary battery can have a higher capacity. In the general formula, MI represents one or more kinds of transition metal, and for example, at least either cobalt or nickel is preferable. In the general formula, the value of x depends upon charge-discharge conditions of the battery, and are generally within a range of $0.05 \le x \le 1.10$. Specific examples of such lithium-containing metal composite oxide include $LiCoO_2$, $LiNiO_2$ and the like.

The cathode 40 can be formed through the following steps, for example. At first, the cathode active material, the conducive material and the binder are mixed to form a mixture, and then a dispersion medium such as N-methyl pyrrolidone is added to the mixture to form cathode mixture slurry. Next, after the cathode mixture slurry is applied to the cathode current collector 41 made of metal foil, and is dried, the cathode mixed active material layer 42 is formed through compression molding to form the cathode 40.

The separator 50 isolates between the anode 10 and the cathode 40 so as to pass lithium ions through while preventing a short circuit of a current due to the contact between the anode 10 and the cathode 40. The separator 50 is made of, for example, polyethylene, polypropylene, or the like.

The separator 50 is impregnated with an electrolyte solution which is a liquid electrolyte. The electrolyte solution includes, for example, a solvent and a lithium salt as an electrolyte salt which is dissolved in the solvent, and an additive if necessary. Examples of the solvent include organic solvents such as ethylene carbonate, propylene carbonate, dimethyl carbonate, diethyl carbonate and ethyl methyl carbonate, and one kind or a mixture including two or more kinds selected from them may be used.

Examples of the lithium salt include $LiPF_6$, $LiClO_4$ and $LiCF_3SO_3$, and one kind or a mixture including two or more kinds selected from them may be used.

For example, a laminate including the anode 10, the separator 50 impregnated with the electrolyte solution, and the cathode 40 is contained in the package cup 20 and the package can 30, and then the package cup 20 and the package can 30 are caulked to form the secondary battery.

When the secondary battery is charged, lithium ions are extracted from the cathode 40, and inserted into the anode 10 through the electrolyte solution. On the other hand, when the secondary battery is discharged, for example, lithium ions are extracted from the anode 10, and inserted into the cathode 40 through the electrolyte solution. The anode active material layer 12 expands or shrinks during charge and discharge. However, the anode current collector 11 has the projection 11B, so adhesion properties between the anode current collector 11 and the anode active material layer 12 are improved by an excellent effect of anchoring with the projection 11B, thereby the anode active material layer 12 can be prevented from falling off, peeling off and being cracked into small pieces, and decomposition of the electrolyte solution can be prevented accordingly.

The anode 10 according to the embodiment may be used in the following secondary battery.

Figure 3:
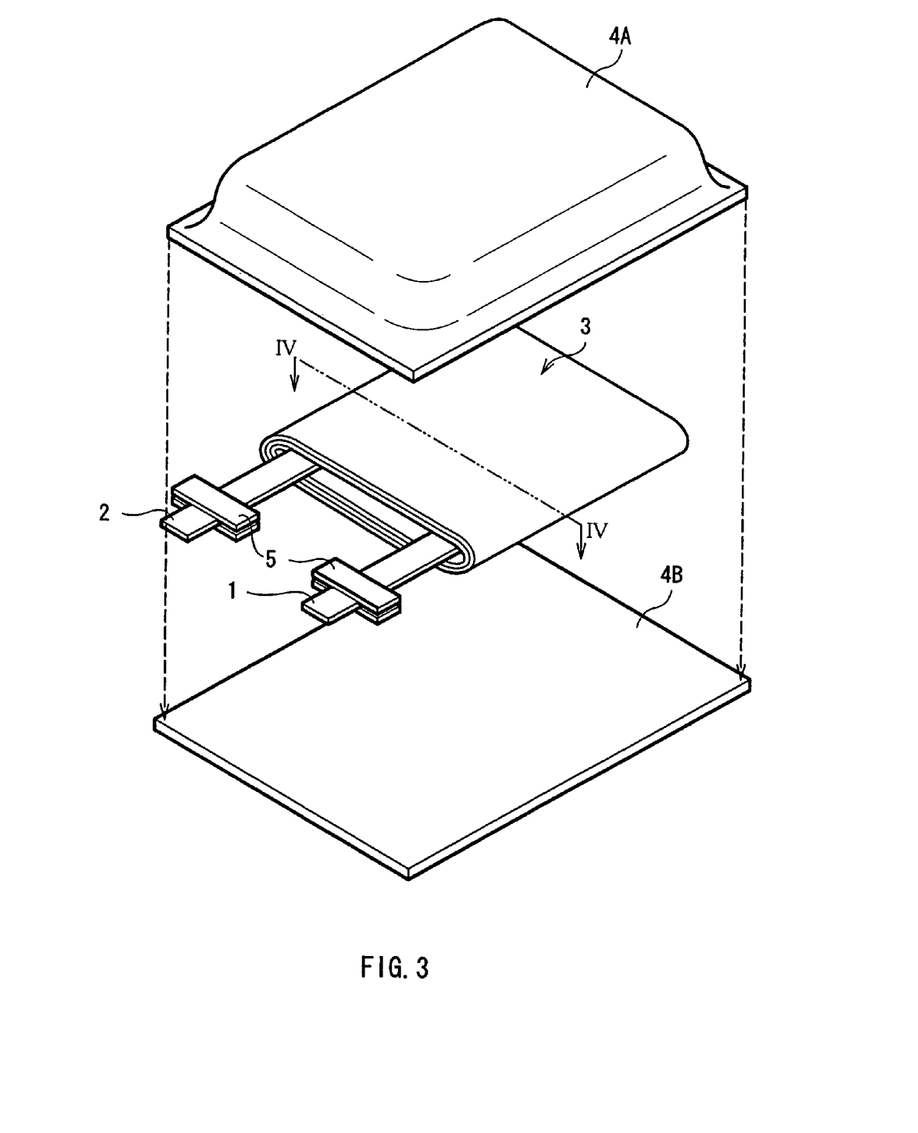
FIG. 3 is a exploded perspective view of another secondary battery using the anode shown in FIG. 1.

FIG. 3 shows the structure of the secondary battery. In the secondary battery, a spirally wound electrode body 3 to which an anode lead 1 and a cathode lead 2 are attached is contained in film-shaped package parts 4A and 4B, thereby the size, the weight and the thickness of the secondary battery can be reduced.

The anode lead 1 and the cathode lead 2 are laid from the interiors of the package parts 4A and 4B to outside, for example, in the same direction. The anode lead 1 and the cathode lead 2 are made of, for example, a metal material such as aluminum, copper, nickel or stainless, and are formed into a sheet shape or a mesh shape.

The package parts 4A and 4B are made of a rectangular aluminum laminated film including, for example, a nylon film, aluminum foil and a polyethylene film which are stuck together in this order. The package parts 4A and 4B are disposed so that a polyethylene film side of the package parts 4A and 4B face the spirally wound electrode body 3, and edge portions of the package parts 4A and 4B are put together by fusion bonding or with an adhesive. A contact film 5 for preventing the entry of outside air is inserted each between the package part 4A and the anode lead 1, the package part 4A and the cathode lead 2, the package part 4B and the anode lead 1, and the package part 4B and the cathode lead 2. The contact film 5 is made of a material with adhesion properties to the anode lead 1 and the cathode lead 2, for example, a polyolefin resin such as polyethylene, polypropylene, modified polyethylene or modified polypropylene.

Alternatively, the package parts 4A and 4B may be made of a laminated film with another structure, a high molecular weight film such as polypropylene, or a metal film instead of the above aluminum laminated film.

Figure 4:
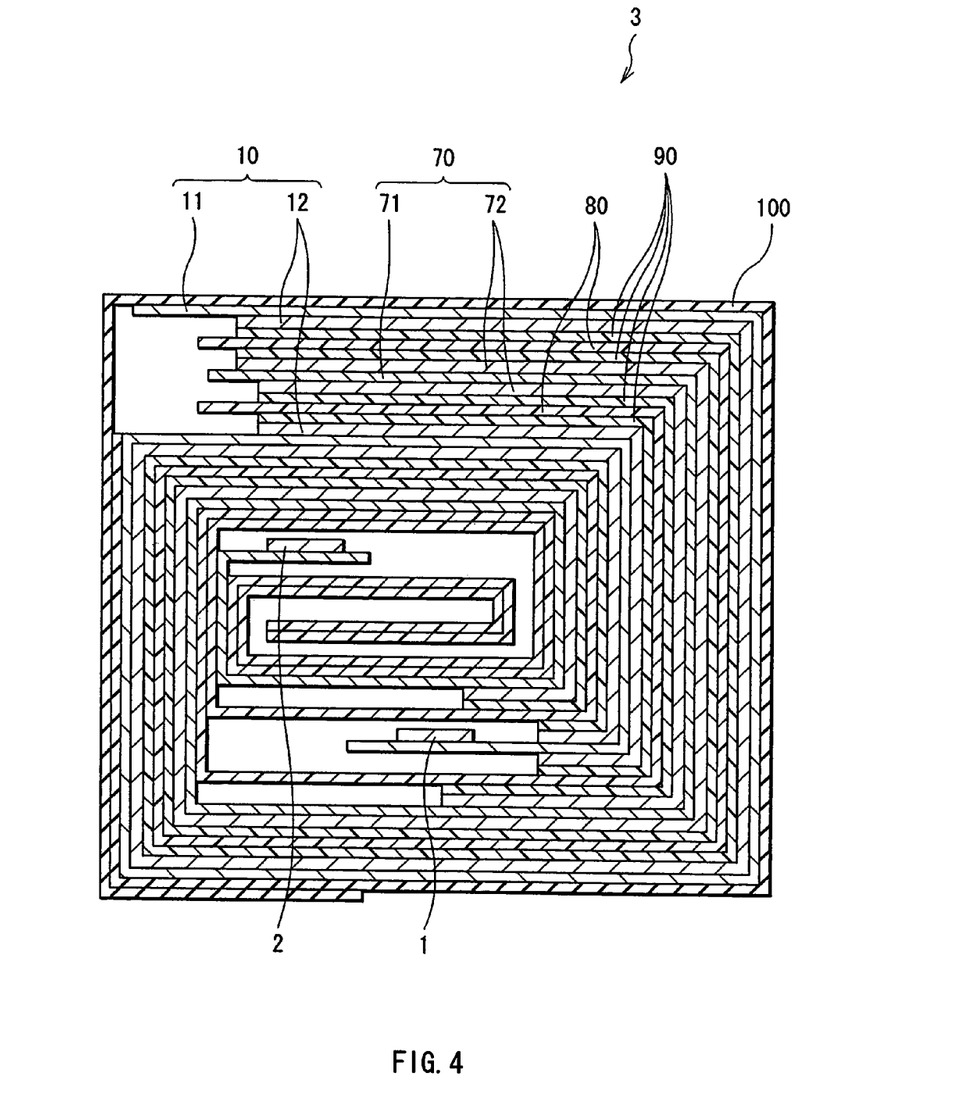
FIG. 4 is a sectional view of a spirally wound electrode body taken along a line IV-IV shown in FIG. 3.

FIG. 4 shows a sectional view of the spirally wound electrode body 3 taken along a line IV-IV in FIG. 3. The spirally wound electrode body 3 is formed through spirally winding a laminate including the above anode 10 and a cathode 70 with a separator 80 and an electrolyte layer 90 in between. The outermost portion of the spirally wound electrode body 3 is protected with a protective tape 100. For the sake of convenience, the anode 10 is simplified in FIG. 4.

The anode 10 has a structure in which the anode active material layer 12 is disposed on one side or both sides of the anode current collector 11, and the cathode 70 has a structure in which a cathode active material layer 72 is disposed on one side or both sides of a cathode current collector 71. The structures of the cathode current collector 71, the cathode active material layer 72 and the separator 80 are equivalent to those of the cathode current collector 41, the cathode active material layer 42 and the separator 50, respectively.

The electrolyte layer 90 is made of a so-called gel electrode in which a retaining body retains an electrolyte solution. The gel electrolyte is preferable because leakage of the battery or swelling of the battery due to high temperature can be prevented. The components of the electrolyte solution (that is, a solvent and an electrolyte salt) are equivalent to those in the coin type secondary battery shown in FIG. 2.

The retaining body is made of, for example, a high molecular weight material. As the high molecular weight material, for example, polyvinylidene fluoride which is a block copolymer is used.

The secondary battery can be manufactured through the following steps, for example.

At first, on the anode 10 and the cathode 70 each, the electrolyte layer 90 in which the retaining body retains the electrolyte solution is formed. After that, the anode lead 1 and the cathode lead 2 are welded to an end portion of the anode current collector 11 and an end portion of the cathode current collector 71, respectively.

Next, the anode 10 with the electrolyte layer 90 formed thereon and the cathode 70 with the electrolyte layer 90 formed thereon are laminated with the separator 80 in between to form a laminate, and then the laminate is spirally wound in a longitudinal direction, and the protective tape 100 is bonded to an outermost portion of the laminate, thereby the spirally wound electrode body 3 is formed.

Finally, for example, the spirally wound electrode body 3 is sandwiched between the package parts 4A and 4B, and then the edge portions of the package parts 4A and 4B are put together by heat fusion welding or the like, thereby the spirally wound electrode body 3 is enclosed in the package parts 4A and 4B. At this time, the contact film 5 is inserted each between the anode lead 1 and the package part 4A, the anode lead 1 and the package part 4B, the cathode lead 2 and the package part 4A, and the cathode lead 2 and the package part 4B. Thereby, the secondary battery shown in FIGS. 3 and 4 is completed.

Actions of the secondary battery are the same as those of the coin type secondary battery shown in FIG. 2.

Thus, in the embodiment, the anode current collector 11 having the projection 11B is included, so the adhesion properties between the anode current collector 11 and the anode active material layer 12 can be improved by an excellent effect of anchoring with the projection 11B. As a result, the anode active material layer 12 can be prevented from falling off, peeling off and being cracked into small pieces due to expansion and shrinkage of the anode active material layer 12 upon charge and discharge, and decomposition of the electrolyte solution can be prevented accordingly.

More specifically, when the projection 11B has an average diameter ranging from 1 µm to 20 µm, the adhesion properties between the anode current collector 11 and the anode active material layer 12 can be further improved, and as a result, cycle characteristics can be further improved.

Moreover, when the projection 11B includes an element capable of being alloyed with the anode active material layer 12, the projection 11B promotes alloying between the anode current collector 11 and the anode active material layer 12. Therefore, also in this case, the adhesion properties between the anode current collector 11 and the anode active material layer 12 can be further improved, and the cycle characteristics can be further improved accordingly.

Specific examples illustrative of the present invention will be described in detail below.

Examples 1-1 and 1-2

At first, the projection 11B made of copper in a particle shape was formed on the substrate 11A made of copper foil with a thickness of 25 µm and an arithmetic mean roughness Ra of 0.2 µm by an electrolytic deposition method so as to form the anode current collector 11. Next, the anode active material layer 12 was formed on the anode current collector 11 to form the anode 10. At that time, in Example 1-1, the anode active material layer 12 made of amorphous silicon with a thickness of 5 µm was formed by electron beam evaporation. On the other hand, in Example 1-2, the anode active material layer 12 is formed through the following steps. After N-methyl pyrrolidone was added to a mixture including crystalline silicon powder with an average particle diameter of 1 µm and polyvinylidene fluoride at a mass ratio of 90:10 to form anode mixture slurry, the anode mixture slurry was applied to the anode current collector 11, and was dried, and then pressure is applied to the anode mixture slurry. Next, the anode mixture slurry was sintered in an argon (Ar) atmosphere at 400° C. for 24 hours by heat treatment, thereby the anode active material layer 12 was formed. When the obtained anode 10 was analyzed by XPS (X-ray photoelectron spectroscopy), AES (Auger electron spectroscopy), an EDX (energy dispersive X-ray spectroscope) and a TEM (transmission electron microscope), it was confirmed that the anode active material layer 12 was alloyed with the anode current collector 11 in at least a portion of the interface with the projection 11B. The average diameter of the projection 11B was 3 µm by actual measurement with a SEM (scanning electron microscope).

Next, the coin type secondary battery shown in FIG. 2 was formed using the anode 10 of each of Examples 1-1 and 1-2. The cathode 40 was formed through the following steps. A mixture including lithium cobalt oxide ($LiCoO_2$) powder with an average particle diameter of 5 µm as the cathode active material, carbon black as a conducive material and polyvinylidene fluoride as a binder at a mass ratio of 92:3:5 was added to N-methyl pyrrolidone as a dispersion medium to form cathode mixture slurry. Then, the cathode mixture slurry was applied to the cathode current collector 41 made of aluminum with a thickness of 30 μm, and was dried, and then pressure was applied to the cathode mixture slurry to form the cathode active material layer 42. Thereby, the cathode 40 was formed. The used electrolyte solution was formed through dissolving $LiPF_6$ as the lithium salt in a mixed solvent of ethylene carbonate and diethyl carbonate at a mass ratio of 1:1 so that the concentration of $LiPF_6$ in the solvent was 1.0 mol/dm$^3$. As the separator 50, a polypropylene film was used.

A charge-discharge test was carried out on the secondary batteries of Examples 1-1 and 1-2 at 25° C., and a capacity retention ratio in the 30th cycle was determined. At that time, charge was carried out at a constant current density of 1 mA/cm$^2$ until the battery voltage reached 4.2 V, then charge was carried out at a constant voltage of 4.2 V until the current density reached 0.02 mA/cm$^2$. On the other hand, discharge was carried out at a constant current density of 1 mA/cm$^2$ until the battery voltage reached 2.5 V. When charge was carried out, based upon the charge-discharge capacities of the anode 10 and the cathode 40 previously determined by actual measurement and calculation, the utilization factor of the anode in the first charge was set to be 90% to prevent deposition of lithium metal. A capacity retention ratio in the 30th cycle was determined as a ratio of the discharge capacity in the 30th cycle to the discharge capacity in the first cycle, that is, (discharge capacity in the 30 cycle)/(discharge capacity in the first cycle)×100. The obtained results are shown in Table 1.

Next, secondary batteries were formed using the anodes of Comparative Examples 1-1 through 1-4 as in the case of Examples 1-1 and 1-2. A charge-discharge test was carried out on the secondary batteries of Comparative Examples 1-1 through 1-4 as in the case of Example 1-1 to determine the capacity retention ratio in the 30th cycle. The results are also shown in Table 1.

It is evident from Table 1 that in Examples 1-1 and 1-2 in which the anode current collector 11 had the projection 11B, a higher capacity retention ratio could be obtained, compared to Comparative Examples 1-1 and 1-2 in which the anode current collector 11 had no projection. On the other hand, compared between Comparative Examples 1-3 and 1-4 in which the anode active material layer was formed through coating, the secondary battery of Example 1-3 which had no projection could obtain a higher capacity retention ratio than that of Comparative Example 1-4 which had the projection. In other words, it was found out that in the case where the anode active material layer 12 was formed through the vapor deposition method or the sintering method, when the anode current collector 11 had the projection 11B, the cycle characteristics could be improved.

Example 2

The anode 10 was formed as in the case of Example 1-1, except that the substrate 11A made of nickel foil with a thickness of 20 μm and an arithmetic mean roughness Ra of

TABLE 1

| | ANODE CURRENT COLLECTOR | | | | METHOD OF | |
| --- | --- | --- | --- | --- | --- | --- |
| | SUBSTRATE | | PROJECTION | | FORMING ANODE ACTIVE MATERIAL LAYER | CAPACITY RETENTION RATIO (%) |
| | MATERIAL | Ra (μm) | MATERIAL | AVERAGE DIAMETER (μm) | FORMING METHOD | |
| EXAMPLE 1-1 | Cu | 0.2 | Cu | 3 | ELECTROLYTIC DEPOSITION | DEPOSITION | 92 |
| EXAMPLE 1-2 | Cu | 0.2 | Cu | 3 | ELECTROLYTIC DEPOSITION | SINTERING | 88 |
| COMPARATIVE EXAMPLE 1-1 | Cu | 0.2 | — | 0 | — | DEPOSITION | 39 |
| COMPARATIVE EXAMPLE 1-2 | Cu | 0.2 | — | 0 | — | SINTERING | 31 |
| COMPARATIVE EXAMPLE 1-3 | Cu | 0.2 | — | 0 | — | COATING | 22 |
| COMPARATIVE EXAMPLE 1-4 | Cu | 0.2 | Cu | 3 | ELECTROLYTIC DEPOSITION | COATING | 20 |

As Comparative Examples 1-1 and 1-2 relative to Examples 1-1 and 1-2, the anode 10 was formed as in the case of Examples 1-1 and 1-2, except that the same substrate as that used in Examples 1-1 and 1-2 was used as the anode current collector. Moreover, as Comparative Examples 1-3 and 1-4, anodes were formed through coating an anode current collector with an anode active material layer. At that time, the anode active material layer was formed as follows. At first, N-methyl pyrrolidone was added to a mixture including crystalline silicon powder with an average particle diameter of 1 μm and polyvinylidene fluoride at a mass ratio of 90:10 to form anode mixture slurry, and the anode mixture slurry was applied to the anode current collector, and was dried. Then, pressure was applied to the anode mixture slurry to form the anode active material layer. In Comparative Example 1-3, the same substrate as that in Examples 1-1 and 1-2 was used as the anode current collector, and in Comparative Example 1-4, the same anode current collector as that in Examples 1-1 and 1-2 was used.

0.05 μm was used. When the anode 10 of Example 2 was analyzed by the XPS, the AES, the EDX and the TEM, it was confirmed that the anode active material layer 12 was alloyed with the anode current collector 11 in at least a portion of the interface with the projection 11B. Moreover, as in the case of Examples 1-1 and 1-2, the average diameter of the projection 11B was 3 μm by actual measurement with the SEM. Moreover, as Comparative Example 2 relative to Example 2, an anode was formed as in the case of Example 2, except that the same substrate as that in Example 2 was used as the anode current collector. Then, secondary batteries were formed using the anodes of Example 2 and Comparative Example 2 as in the case of Example 1-1. A charge-discharge test was carried out on the secondary batteries of Example 2 and Comparative Example 2 as in the case of Example 1-1 to determine the capacity retention ration in the 30th cycle. The results are shown in Table 2 together with the results of Example 1-1 and Comparative Example 1-1.

TABLE 2

| | ANODE CURRENT COLLECTOR | | | | METHOD OF | |
| | SUBSTRATE | | PROJECTION | | FORMING ANODE ACTIVE | CAPACITY RETENTION |
| | MATERIAL | Ra (μm) | MATERIAL | AVERAGE DIAMETER (μm) | FORMING METHOD | MATERIAL LAYER | RATIO (%) |
|---|---|---|---|---|---|---|---|
| EXAMPLE 1-1 | Cu | 0.2 | Cu | 3 | ELECTROLYTIC DEPOSITION | DEPOSITION | 92 |
| EXAMPLE 2 | Ni | 0.05 | Cu | 3 | ELECTROLYTIC DEPOSITION | DEPOSITION | 89 |
| COMPARATIVE EXAMPLE 1-1 | Cu | 0.2 | — | 0 | — | DEPOSITION | 39 |
| COMPARATIVE EXAMPLE 2 | Ni | 0.05 | — | 0 | — | DEPOSITION | 28 |

It is evident from Table 2 that like Example 1-1, the secondary battery of Example 2 could obtain a higher capacity retention ratio than that of corresponding Comparative Example 2. In other words, it was found out that even if the material of the substrate 11A and the material of the projection 11B were different from each other, the cycle characteristics could be improved.

Examples 3-1 Through 3-7

The anode 10 was formed as in the case of Example 1-1, except that the anode current collector 11 was formed through the following steps. After anode mixture slurry including powder including copper particles, plyvinylidene fluoride and N-methyl pyrrolidone was applied to the substrate 11A made of the same copper foil as that in Example 1-1, and dried, pressure was applied to the slurry, and the slurry was sintered in an argon atmosphere so as to form the anode current collector 11. When the anode 10 of each of Examples 3-1 through 3-7 was analyzed by the XPS, the AES, the EDX and the TEM as in the case of Example 1-1, it was confirmed that the anode active material layer 12 was alloyed with the anode current collector 11 in at least a portion of the interface with the projection 11B in the anode current collector 11. Moreover, the average diameter of the projection 11B was substantially the same as the average particle diameter of the used copper particle by actual measurement. The average diameter of the projection in each of Examples 3-1 through 3-7 is shown in Table 3. Next, a secondary battery was formed using the anode 10 of each of Examples 3-1 through 3-7 as in the case of Example 1-1. A charge-discharge test was carried out on the secondary batteries of Examples 3-1 through 3-7 as in the case of Example 1-1 to determine the capacity retention ratio in the 30th cycle. The results are shown in Table 3.

TABLE 3

| | ANODE CURRENT COLLECTOR | | | | METHOD OF | |
| | SUBSTRATE | | PROJECTION | | FORMING ANODE ACTIVE | CAPACITY RETENTION |
| | MATERIAL | Ra (μm) | MATERIAL | AVERAGE DIAMETER (μm) | FORMING METHOD | MATERIAL LAYER | RATIO (%) |
|---|---|---|---|---|---|---|---|
| EXAMPLE 3-1 | Cu | 0.2 | Cu | 0.5 | SINTERING | DEPOSITION | 71 |
| EXAMPLE 3-2 | Cu | 0.2 | Cu | 1 | SINTERING | DEPOSITION | 83 |
| EXAMPLE 3-3 | Cu | 0.2 | Cu | 3 | SINTERING | DEPOSITION | 90 |
| EXAMPLE 3-4 | Cu | 0.2 | Cu | 5 | SINTERING | DEPOSITION | 93 |
| EXAMPLE 3-5 | Cu | 0.2 | Cu | 10 | SINTERING | DEPOSITION | 83 |
| EXAMPLE 3-6 | Cu | 0.2 | Cu | 20 | SINTERING | DEPOSITION | 78 |
| EXAMPLE 3-7 | Cu | 0.2 | Cu | 30 | SINTERING | DEPOSITION | 69 |

It is evident from Table 3 that there was a tendency that as the average diameter of the projection 11B increased, the capacity retention ratio increased to the maximum value, then decreased. In other words, it was found out that in order to improve the cycle characteristics, the projection 11B preferably had an average diameter ranging from 1 μm to 20 μm, and more preferably an average diameter ranging from 3 μm to 10 μm.

Examples 4-1 Through 4-4

As Examples 4-1 and 4-2, the anode current collector 11 was formed as in the case of Example 3-1, except that the substrate 11A made of titanium foil with a thickness of 30 μm and an a arithmetic mean roughness Ra of 0.05 μm was used, and powder including titanium particles were used, and the anode 10 was formed through forming the anode active material layer 12 on the anode current collector 11 through the sintering method as in the case of Example 1-2. Moreover, as Examples 4-3 and 4-4, the anode current collector 11 was formed through depositing copper particles with different sizes on the anode current collector of each of Examples 4-1 and 4-2 through vacuum deposition to form a layer with a thickness of 1 μm, then the anode active material layer 12 was formed on the anode current collector 11 as in the case of Example 1-2 to form the anode 10. When the anode 10 of each of Examples 4-1 through 4-4 was analyzed by the XPS, the AES, the EDX and the TEM as in the case of Example 1-1, it was confirmed that the anode active material layer 12 was alloyed with the anode current collector 11 in at least a portion of the interface with the projection 11B, and the degree of alloying is larger in Examples 4-3 and 4-4 than in Examples 4-1 and 4-2. Moreover, when the average diameter of the projection 11B in the anode 10 of each of Examples 4-1 and 4-2 was actually measured by the SEM, it was found out that the average diameter of the projection 11B was substantially the same as the average particle diameter of the used titanium particle. The average diameter of the projection 11B in Examples 4-1 and 4-2 and the average particle diameter of the titanium powder used in Examples 4-3 and 4-4 are shown in Table 4. Moreover, a secondary battery was formed using the anode 10 of each of Examples 4-1 through 4-4 as in the case of Example 1-1. A charge-discharge test was carried out on the secondary batteries of Examples 4-1 through 4-4 as in the case of Example 1-1 to determine the capacity retention ratio in the 30th cycle. The results are shown in Table 4.

As the solid electrolyte, for example, a solid high molecular weight electrolyte in which an electrolyte salt is dispersed in a high molecular weight compound having ionic conductivity, or an inorganic solid electrolyte made of ion conducting glass, ionic crystal or the like can be used. In this case, as the high molecular weight compound, for example, an ether-based high molecular weight compound such as polyethylene oxide or a cross-link including polyethylene oxide, a ester-based high molecular weight compound such as polymethacrylate, an acrylate-based high molecular weight compound, a mixture thereof, or any of the above high molecular weight compounds copolymerized in molecules can be used. Further, as the inorganic solid electrolyte, lithium nitride, lithium phosphate or the like can be used.

Moreover, in the embodiments and the examples, the anode active material layer 12 is formed on the anode current collector 11, but any other layer may be formed between the anode current collector and the anode active material layer.

TABLE 4

| | ANODE CURRENT COLLECTOR | | | | METHOD OF | |
| | SUBSTRATE | | PROJECTION | | FORMING | CAPACITY |
| | | | | AVERAGE | ANODE ACTIVE | RETENTION |
| | MATERIAL | Ra (μm) | MATERIAL | DIAMETER (μm) | FORMING METHOD | MATERIAL LAYER | RATIO (%) |
|---|---|---|---|---|---|---|---|
| EXAMPLE 4-1 | Ti | 0.05 | Ti | 1 | SINTERING | SINTERING | 69 |
| EXAMPLE 4-2 | Ti | 0.05 | Ti | 5 | SINTERING | SINTERING | 74 |
| EXAMPLE 4-3 | Ti | 0.05 | Ti + Cu | 1* | SINTERING + DEPOSITION | SINTERING | 77 |
| EXAMPLE 4-4 | Ti | 0.05 | Ti + Cu | 5* | SINTERING + DEPOSITION | SINTERING | 83 |

*The average particle diameter of titanium powder is shown.

It is evident from Table 4 that compared to Examples 4-1 and 4-2, the capacity retention ratio in Examples 4-3 and 4-4 was higher. It was considered that it was because in the conditions of the experiment, silicon was more easily alloyed with copper than titanium, and as a result, as described above, alloying between the anode current collector 11 and the anode active material layer 12 was more promoted in Examples 4-3 and 4-4 than in Examples 4-1 and 4-2. In other words, it was found out that when the projection 11B included an element which was easily alloyed with the anode active material layer 12, alloying between the anode current collector 11 and the anode active material layer 12 could be promoted, and thereby superior cycle characteristics could be obtained.

Although in the above examples, the materials of the substrate 11A and the projection 11B are described referring to specific examples, even if any other materials are used, the same results can be obtained. Moreover, even if the anode active material layer 12 is formed through any vapor deposition method other than evaporation, any other sintering method, or the liquid-phase deposition method, the same effects can be obtained.

The present invention is described referring to the embodiments and the examples, but the invention is not limited to the above embodiments and the examples, and is variously modified. For example, in the embodiments and the examples, the electrolyte solution which is a liquid electrolyte, or the so-called gel electrolyte is used, but any other electrolyte may be used. Examples of the other electrolyte include a solid electrolyte having ionic conductivity, a mixture of the solid electrolyte and the electrolyte solution, or a mixture of the solid electrolyte and the gel electrolyte.

Further, in the embodiments and the examples, the coin type secondary battery and the spirally wound laminate type secondary battery are described. However, the invention can be applied to a cylindrical type secondary battery, a prismatic type secondary battery, a button type secondary battery, a thin type secondary battery, a large type secondary battery and a multilayer laminate type secondary battery in a like manner, and the invention can be applied to not only secondary batteries but also primary batteries.

As described above, the anode according to an embodiment of the invention or the battery according to the invention comprises the anode current collector having a projection, so by an excellent effect of anchoring with the projection, the adhesion properties between the anode current collector and the anode active material layer can be improved. As a result, the anode active material layer can be prevented from falling off, peeing off and being cracked into small pieces due to expansion and shrinkage of the anode active material layer upon charge and discharge, and decomposition of the electrolyte can be prevented accordingly. Further, the cycle characteristics can be improved.

More specifically, in the anode according to the invention or the battery according to the invention, the average diameter of the projection is within a range of 1 μm to 20 μm, so the adhesion properties between the anode current collector and the anode active material layer can be further improved, and the cycle characteristics can be further improved accordingly.

Moreover, in the anode according to an embodiment of the invention or the battery according to an embodiment of the invention, the projection includes an element capable of being alloyed with the anode active material layer, so the projection The invention is claimed as follows:

1. An anode, comprising:
   an anode current collector having a projection formed on a substrate; and
   an anode active material layer being formed on and covering the anode current collector and projection through at least one method selected from the group consisting of a vapor deposition method, a liquid-phase deposition method and a sintering method, and including at least one material selected from the group consisting of silicon (Si) and silicon compounds, wherein an average diameter of the projection ranges from about 3 μm to about 10 μm, and wherein the projection includes an element capable of being alloyed with the anode active material layer.

2. The anode according to claim 1, wherein
   the anode active material layer is alloyed with the anode current collector in at least a portion of an interface with the anode current collector.

3. The anode according to claim 1, wherein
   the projection is in a particle shape selected from the group consisting of a square shape, a spherical shape, a rock shape and a block shape.

4. The anode according to claim 1, wherein
   the projection includes at least one constituent selected from the group consisting of copper (Cu), nickel (Ni), iron (Fe), aluminum (Al), indium (In), cobalt (Co), manganese (Mn), zinc (Zn), silver (Ag), tin (Sn), germanium (Ge) and lead (Pb).

5. The anode according to claim 1, wherein
   the anode active material layer is alloyed with the projection in at least a portion of an interface with the projection.

6. A battery, comprising:
   a cathode;
   an anode; and
   an electrolyte,
   wherein the anode includes an anode current collector having a projection formed on a substrate, and
   an anode active material layer being formed on and covering the anode current collector and projection through at least one method selected from the group consisting of a vapor deposition method, a liquid-phase deposition method and a sintering method, and including at least one type of material selected from the group consisting of silicon (Si) and silicon compounds, wherein an average diameter of the projection ranges from about 3 μm to about 10 μm, and wherein the projection includes an element capable of being alloyed with the anode active material layer.

7. The battery according to claim 6, wherein
   the anode active material layer is alloyed with the anode current collector in at least one portion of an interface with the anode current collector.

8. The battery according to claim 6, wherein
   the projection is in a particle shape selected from the group consisting of a square shape, a spherical shape, a rock shape and a block shape.

9. The battery according to claim 6, wherein
   the projection includes at least one constituent selected from the group consisting of copper (Cu), nickel (Ni), iron (Fe), aluminum (Al), indium (In), cobalt (Co), manganese (Mn), zinc (Zn), silver (Ag), tin (Sn), germanium (Ge) and lead (Pb).

10. The battery according to claim 6, wherein
    the anode active material layer is alloyed with the projection in at least a portion of an interface with the projection.

11. The battery according to claim 6, wherein
    the electrolyte includes a solvent, an electrolyte salt and a body which retains the solvent and electrolyte salt.

12. The battery according to claim 6, further comprising:
    a package part made of a film for containing the cathode, the anode and the electrolyte therein.

13. The battery according to claim 6, wherein
    the cathode includes a lithium-containing metal composite oxide.

14. The anode according to claim 1, wherein the average diameter of the projection ranges from about 3 μm to about 5 μm.

15. The battery according to claim 6, wherein the average diameter of the projection ranges from about 3 μm to about 5 μm.

16. The anode according to claim 1, wherein the projection is made of an element capable of being alloyed with the anode active material layer.

* * * * *